(12) United States Patent
Lindloff

(10) Patent No.: US 8,459,517 B2
(45) Date of Patent: Jun. 11, 2013

(54) MOTORCYCLE PASSENGER BACKREST

(75) Inventor: Christopher D. Lindloff, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 159 days.

(21) Appl. No.: 12/657,752

(22) Filed: Jan. 27, 2010

(65) Prior Publication Data

US 2011/0181070 A1    Jul. 28, 2011

(51) Int. Cl.
*B62J 7/00* (2006.01)
*B62J 9/00* (2006.01)
*B62J 11/00* (2006.01)

(52) U.S. Cl.
USPC ........... 224/413; 224/427; 224/442; 224/443; 224/444; 224/447; 224/448; 224/450

(58) Field of Classification Search
USPC ................. 224/413, 427, 442, 443, 444, 447, 224/448, 450
See application file for complete search history.

(56) References Cited

U.S. PATENT DOCUMENTS

| | | | | |
|---|---|---|---|---|
| 4,570,998 A * | 2/1986 | Hughes | ......................... | 297/353 |
| 6,484,914 B1 * | 11/2002 | Willey | ........................ | 224/413 |
| 6,568,699 B2 * | 5/2003 | McCann | .................... | 280/304.4 |
| 6,659,547 B2 * | 12/2003 | Petersen | .................... | 297/215.1 |
| 6,966,471 B1 * | 11/2005 | Wilson et al. | ................ | 224/413 |
| 6,983,992 B2 * | 1/2006 | Oomori | ........................ | 297/357 |
| 7,131,691 B2 * | 11/2006 | Ziegler | .................... | 297/215.12 |

* cited by examiner

*Primary Examiner* — Nathan J Newhouse
*Assistant Examiner* — Lester L Vanterpool
(74) *Attorney, Agent, or Firm* — Dicke, Billig & Czaja, PLLC

(57) ABSTRACT

A motorcycle passenger backrest has a generally U-shaped or V-shaped backrest frame that is configured for connection to a mounting bracket on the motorcycle. The inner surface of the backrest frame is configured with a recessed space having a base surface and a side surface that extends from the base surface at an angle. A carrier frame configured to fit within the recessed space is pivotally mounted to each leg of the backrest frame. The carrier frame is movable between an up, stored position, with the carrier frame in contact with the base surface of the recessed space, and a down, carrier position, with the carrier frame pivoted away from the backrest frame.

7 Claims, 4 Drawing Sheets

MOTORCYCLE PASSENGER BACKREST

BACKGROUND

The present invention generally relates to custom accessories for a motorcycle. In particular, the present invention relates to a passenger backrest having a fold-down carrier.

SUMMARY OF THE INVENTION

A motorcycle backrest comprises a backrest frame and a carrier frame. The backrest frame has a pair of spaced legs each having a free end. The pair of spaced legs each have a second end, the second ends of the pair of legs being connected together to define a generally U-shaped or V-shaped frame. The backrest frame has an outer surface and an inner surface. The inner surface of the frame is configured to define a recessed space having a base surface and a side surface that extends at an angle relative to the base surface about an inner perimeter of the backrest frame. The carrier frame is configured to have a shape and outer surface contours to match a shape and contour of the base surface and side surface of the recessed space. The carrier frame is pivotally mounted within the recessed space and is movable between a stored position, with the carrier frame in contact with the base surface of the backrest frame, and a carrying position, with the carrier frame pivoted away from the base surface.

DETAILED DESCRIPTION

Figure 1:
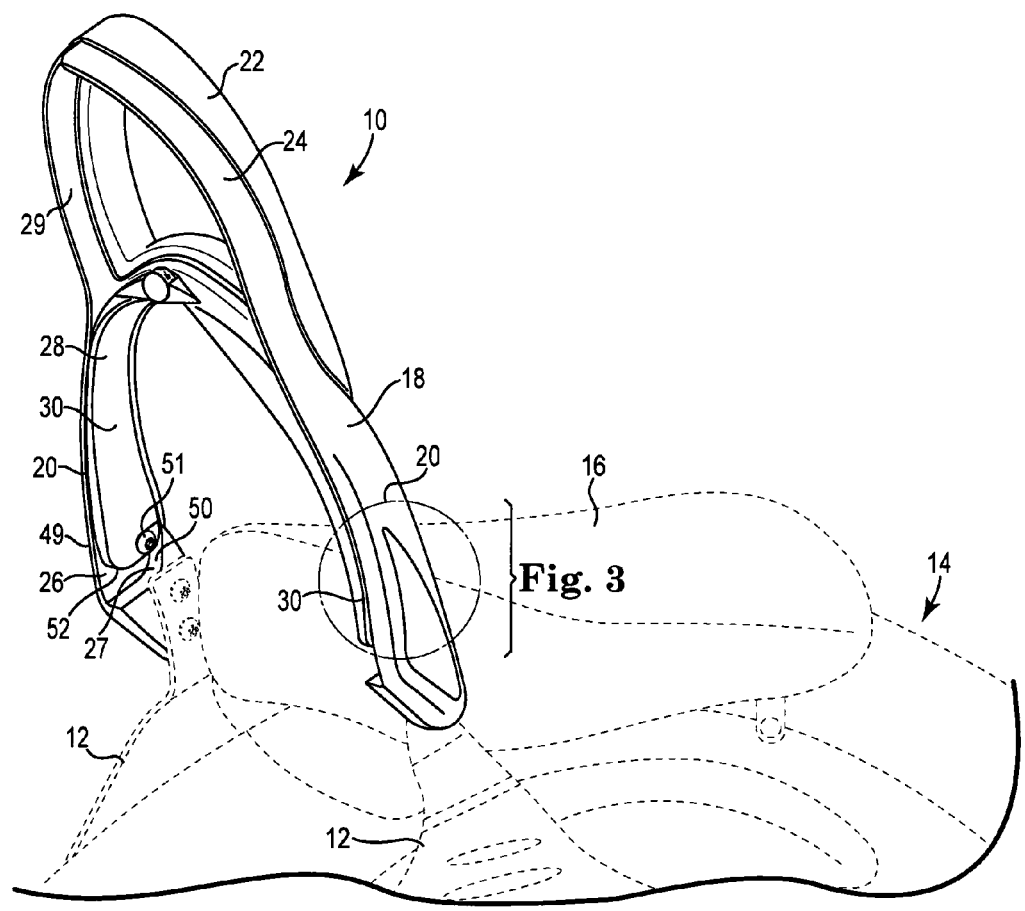
FIG. 1 is a rear perspective view of a motorcycle passenger backrest of the present invention.

FIG. 1 is a rear perspective view of passenger backrest 10 mounted to brackets 12 that are secured to a motorcycle 14 adjacent to a passenger seat 16. Backrest 10 generally comprises a metal frame 18 having a pair of legs 20 at one end configured for connection to the brackets 12. In one embodiment, frame 18 generally has a U-shaped or a V-shaped perimeter footprint, with a pad 22 connected to an outside surface 24 of frame 18 at an end opposite legs 20. An interior surface 26 of frame 18 is configured to define a recessed space 27 to contain a metal carrier frame 28 substantially within the perimeter footprint of frame 18.

Carrier frame 28 has a generally U-shaped or V-shaped perimeter that is complementary with frame 18, albeit the width of frame 28 is less than the width of frame 18. The outer surface 29 of frame 28 is contoured to match the contours of the outside surface 24 of frame 18 to give the appearance that backrest 10 is constructed from a single frame. Legs 30 of carrier frame 28 are pivotally connected to legs 20 within the recessed space 27, which allows carrier frame 28 to be stored clandestinely relative to frame 18 when the carrier frame 28 is in a stored position (as shown in FIG. 1), and to be pivoted away from frame 18 to a carrying position (as shown in FIG. 2).

Figure 2:
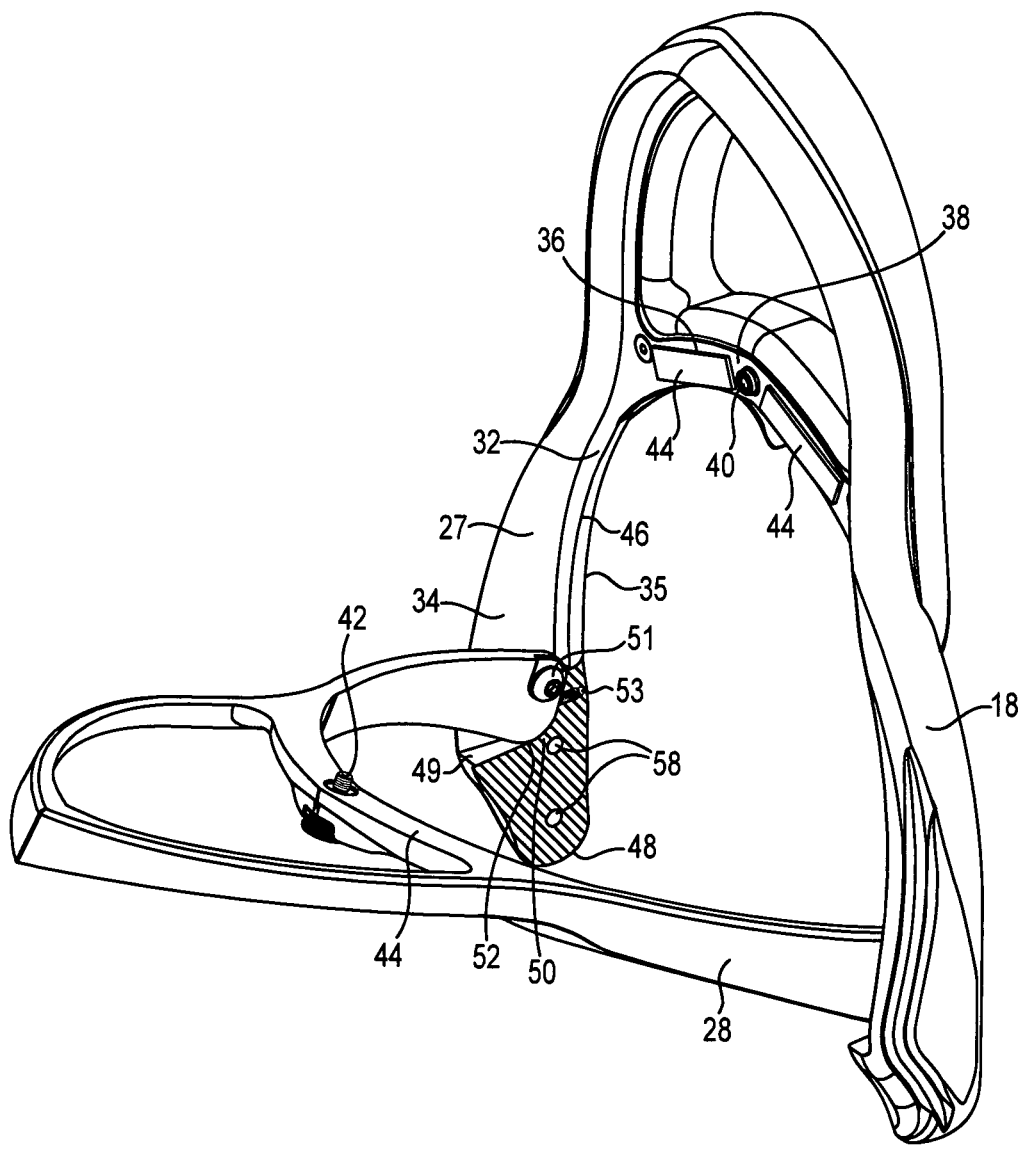
FIG. 2 is a rear perspective view of the passenger backrest of FIG. 1 with a carrier pivoted to a down position.

Referring to FIG. 2, with carrier frame 28 pivoted away from frame 28 to the down, carrying position, more detail of the recessed space 27 can be seen. Recessed space 27 is defined by a base surface 32 and a side surface 34 that extends at an angle relative to the base surface 32. Base surface 32 defines a rearward face about the inner perimeter of frame 18, spaced from and generally normal to a front edge 35 of frame 18, against which frame 28 is seated when frame 28 is in the stored position. Frame 18 is further provided with a metal cross-member 36, the inner surface 38 of which cooperates with base surface 32 to support and retain carrier frame 28 in the stored position. Towards that end, in one embodiment, cross-member 36 is configured with an internally threaded aperture 40 which receives a threaded connector 42 that is retained on a corresponding cross-member 44 of carrier frame 28. In alternate embodiments, other means for securing frame 28 to frame 18, e.g., magnets, hook and loop fasteners, clamps, ties, etc., may be utilized. Pads 44 are secured to inner surface 38 adjacent to aperture 40 to dampen vibration between carrier frame 28 and backrest frame 18. Pads 44 may be formed from an adhesive backed rubber or foam polymer material. In one embodiment, base surface 32 has a width that is generally the same as a thickness of the wall defining carrier frame 28 so that the inner perimeter edge 46 of frame 18 appears nearly seamless when carrier frame 28 is in the stored position.

As shown in FIGS. 1 and 2, the recessed space 27 originates in legs 20 at a point spaced from leg end 48, where base surface 32 curves approximately 90 degrees to define a radiused inside corner 50 and extends toward a rear edge 49 of frame 18. The free end of the carrier frame leg 30 is spaced from the origin of base surface 32 and is pivotally connected to leg 20 by a threaded connector 51. Connector 51 is located off-axis such that when carrier frame 28 is pivoted to the down, carrying position, the outside corner 52 of carrier frame leg 30 registers with the inside corner 50 to support carrier frame 28 in the carrying position. The outside corner of leg 30, immediately adjacent connector 51, is radiused to allow leg 30 to remain close to base surface 32 as it pivots between the stored position and the carrying position. An adjustment screw 53 is provided in an internally threaded cavity to contact the lower edge of carrier frame leg 30 and adjust the down carrying position of carrier frame 28 as necessary. Between end 48 and the start of recessed space 27, each leg 20 is configured with a multiple internally threaded apertures 58 for connecting frame 18 to brackets 12 with threaded connectors (shown in phantom in FIG. 1).

Figure 3:
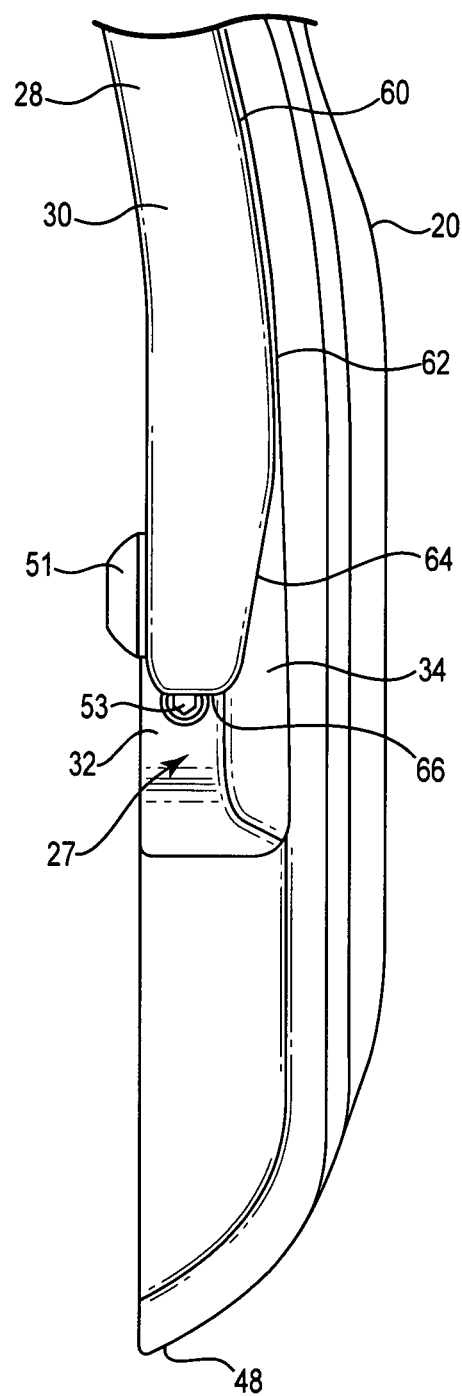
FIG. 3 is an enlarged rear view of a right lower leg portion of the passenger backrest of FIG. 1

FIG. 3 is an enlarge view of a lower portion of the right leg 20 of frame 18, with carrier frame 28 in the stored position. As shown in FIG. 3, side surface 34 of recessed space 27 extends from base surface 32 at an angle that in one embodiment is greater than 90 degrees. The outer surface 60 of carrier frame 28 is configured and contoured to mate with and closely approximate the contour and shape of side surface 34. When the angle of side surface 34 is greater than 90 degrees relative to base surface 32, the base surface 32 is not visible when the carrier frame 28 is in the stored position and the seam 62 between edges of the backrest frame 18 and the carrier frame 28 is substantially camouflaged so as to give the impression that the respective outer surfaces of backrest frame 18 and the carrier frame 28 are in reality one unitary structure. To allow carrier frame 28 to pivot to the down carrying position without interference with side surface 34, the outer surface portion 64 of carrier frame 28 adjacent end 66 of carrier frame 28 is beveled to reduce the wall thickness. As further shown in FIG. 3, adjustment screw 53 is located in base surface 32 to be accessible for adjustment when carrier frame 28 is in the stored position.

Figure 4:
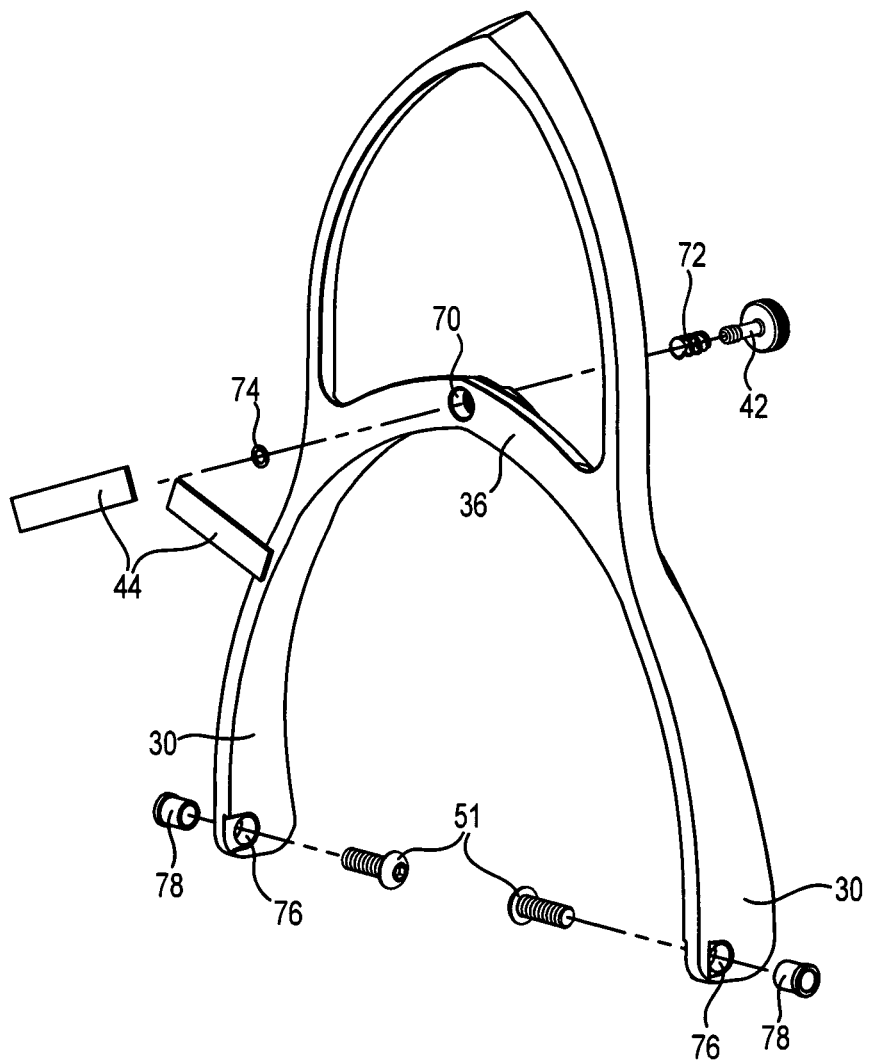
FIG. 4 is an exploded perspective view of the carrier of the passenger backrest of FIG. 1.

FIG. 4 is an exploded perspective view of the carrier frame 28. As shown in FIG. 4, an aperture 70 is provided through cross-member 36 to receive the threaded connector 42. Spring 72 is positioned over the threaded shaft of connector 42 before connector 42 is passed through aperture 70. The threaded shaft of connector 42 has a length sufficient to thread into aperture 40 (FIG. 2) when carrier frame 28 is raised to the stored position. A retention ring 74 is positioned over the threaded shaft of connector 42 to maintain connector 42 in aperture 44 when carrier frame 28 is in the down, carrying position. Apertures 76 are provided in legs 30 to receive threaded connectors 51 as previously described. Bushings are inserted in each aperture 76 before threaded connectors are secured within apertures 58 with a threadlock material (FIG. 2).

The motorcycle backrest 10 of the present invention includes a backrest frame 18 configured with a recessed space 27 about the interior surface of the frame. A carrier frame 28 is sized and configured to fit within the recessed space 27 and give the appearance, when the carrier frame 28 is in the stored position, that the backrest frame and the carrier frame are a single structure. Backrest 10 therefore is able to provide the dual functions of a backrest and a carrier without sacrificing appearance by "hiding" the carrier frame within the backrest frame.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A motorcycle backrest comprising:

A backrest frame having a first pair of spaced legs each having a free end, the first pair of spaced legs each having a second end, the second ends of the first pair of legs being connected together to define a generally U-shaped or V-shaped frame, each leg of the first pair of spaced legs of the backrest frame having an outer surface comprising a generally forward facing surface and a generally side facing surface, a generally rearward facing inner surface, and a rear edge, the inner surface of each leg of the frame configured to define a recessed space having a generally rearward facing base surface spaced from the rear edge and a side surface extending at an angle relative to the base surface from the base surface to the rear edge from the first end to the second end of each leg of the backrest frame; and a carrier frame having a second pair of spaced legs configured to have a shape and outer surface contours to match a shape and contour of the base surface and side surface of the recessed space of the first pair of legs, the carrier frame pivotally mounted within the recessed space and movable between a stored position, with the second pair of legs of the carrier frame in contact with the base surface of each leg of the first pair of legs of the backrest frame, and a carrying position, with the carrier frame pivoted away from the base surface.

2. The motorcycle backrest of claim 1, wherein the base surface curves approximately 90 degrees adjacent each free end to define an inside corner and a transverse base surface, and wherein the carrier frame is a generally U-shaped or V-shaped frame, each leg of the carrier frame having a free end configured with a curved outer edge, each leg pivotally mounted to permit the curved outer edge of each carrier frame leg to register with the inside corner of the base surface when the carrier frame is in the carrying position.

3. The motorcycle backrest of claim 2, wherein the backrest frame further comprises a cross-member connected between the first pair of legs of the backrest frame, the cross-member configured with an internally threaded aperture, and wherein the carrier frame further comprises a cross-member connected between the second pair of legs of the carrier frame, the cross-member of the carrier frame configured with a threaded connector, the threaded connector threadable within the threaded aperture when the carrier frame is in the stored position.

4. The motorcycle backrest of claim 1, wherein the backrest frame further comprises a cross-member connected between the first pair of legs of the backrest frame, and wherein the carrier frame further comprises a cross-member connected between the second pair of legs of the carrier frame, the motorcycle backrest further comprising means for securing the carrier frame to the backrest frame when the carrier frame is in the stored position.

5. The motorcycle backrest of claim 1, wherein the backrest frame further comprises a cross-member connected between the first pair of legs of the backrest frame, and wherein the carrier frame further comprises a cross-member connected between the second pair of legs of the carrier frame, the motorcycle backrest further comprising dampening pads between the respective cross members of the backrest frame and the carrier frame.

6. The motorcycle backrest of claim 1, wherein the base surface has a width, and wherein each leg of the carrier frame has a wall with a thickness that is generally the same as the width of the base surface.

7. The motorcycle backrest of claim 6, wherein each leg of the carrier frame has a rear edge, the rear edge of each leg of the carrier frame being generally aligned with the rear edge of each leg of the backrest frame.

* * * * *